D. W. AMOS.
Horse Rake.
No. 41,187.
Patented Jan. 12, 1864.
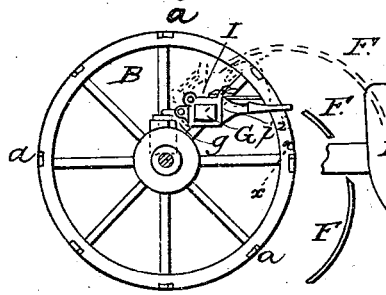
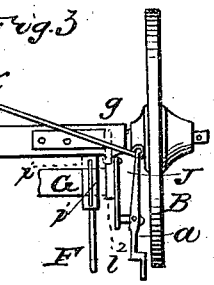
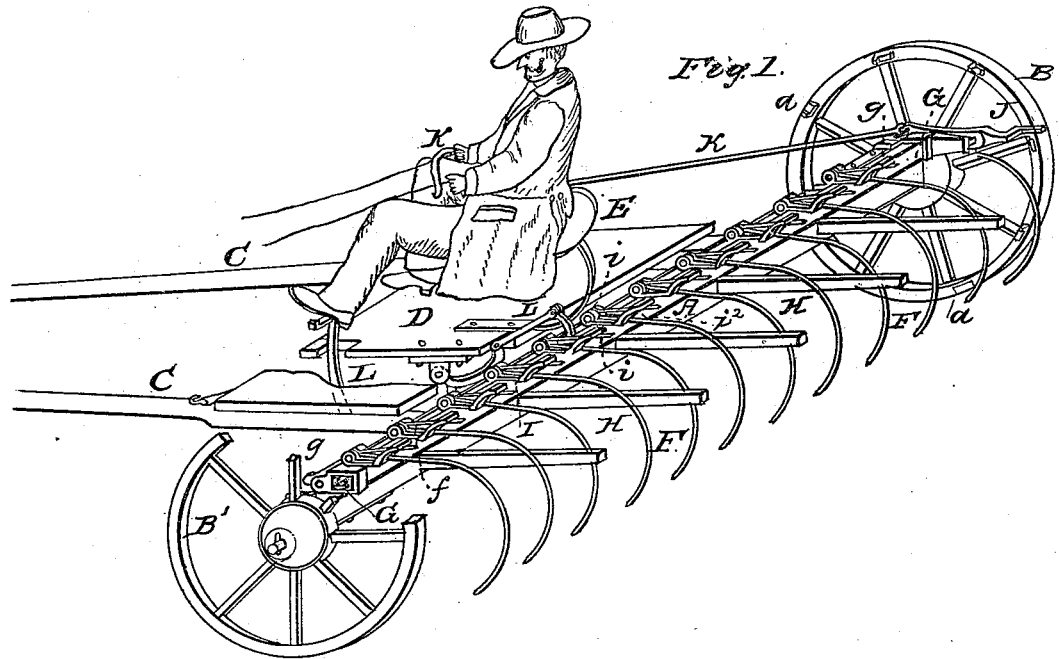
Witnesses
B. Rodman
C. Hardaway
Inventor
D. W. Amos
by his Attorney
Wm D Baldwin

UNITED STATES PATENT OFFICE.

DANIEL W. AMOS, OF BEDFORD, PENNSYLVANIA.

IMPROVEMENT IN HORSE-RAKES.

Specification forming part of Letters Patent No. 41,187, dated January 12, 1864.

*To all whom it may concern:*

Be it known that I, DANIEL W. AMOS, of Bedford, in the county of Bedford and State of Pennsylvania, have invented certain new and useful Improvements in Horse-Rakes, of which the following is a full, clear, and exact description, reference being had to the accompanying drawings, which make part of this specification, and in which—

Figure 1 represents a view in perspective of a horse-rake embracing my improvements; Fig. 2, a view in elevation of a portion of the machine; and Fig. 3, a plan or top view of a portion of the machine, showing the axle, the driver's seat, and the mechanism for elevating the teeth.

It is an object of my invention to provide means whereby the rake-teeth may be automatically lifted at the pleasure of the driver to clear them of the hay and again dropped to gather up a new supply; and to this end my improvement consists in combining a lifting-lever on the rake-frame with tappets or wipers on the wheels and a connecting-rod or knee-lever in such manner that when thrown into gear the knee-lever will control the position of the rake-teeth, as hereinafter described.

Another object of my invention is to provide a method of mounting the rake-teeth in the frame in such manner that the whole of them may rise together or each one separately, and be easily removed or replaced when broken; and to this end my improvement consists in doubling over the upper end of the rake-teeth and mounting it in a bracket on the frame, in the manner hereinafter described.

In the accompanying drawings, the axle A of the machine is represented as supported upon two wheels, B B'. A pair of shafts, C, project from this axle and support a foot-board, D, and a seat, E, for the driver. The rake-teeth F are mounted in a bar or frame, G, pivoted at each end to the axle A by the hinges $g$. Stripping-teeth H are inserted into the axle and project backward between the rake-teeth. A compound lever, L, is pivoted to the frame of the machine and attached to the rake-frame G, so that when actuated by the driver's foot it holds down the rake-teeth and prevents them from rising or riding over the hay.

In order to lift the rake-teeth when desired, a lever, J, is pivoted near its center to one end of the rake-frame, so as to play freely horizontally. Wipers or tappets $a$ are secured upon the inner face of the wheel B at suitable intervals. A connecting-rod or knee-lever, K, extends from the lifting-lever J to the driver's seat.

The rake-teeth are inserted in the frame in the following manner: Small cast-iron brackets I are inserted into the rake-bar G at suitable intervals and properly secured therein. These brackets are flat in their central portion, $i$, and rise at each end, so as to form a lug, $i'$, at one end and a slotted standard or upright, $i^2$, at the other. The upper end of the rake-tooth is doubled over, as shown in the drawings, so as to form a spring, $f$, and inserted in the bracket in such manner that the fore ends of the springs respectively press against the top and bottom of the slot in the standard $i^2$ until the bent ends are held in place in the lugs by pins passing through the lugs and the eyes of the springs. By this arrangement the teeth are rendered so elastic that each one is free to yield independently of the others, and all can rise together when the rake-bar is lifted.

I am aware that the rake-teeth have heretofore been made elastic and to rise independently by various devices, and therefore limit my claim on this feature of my invention to the specific devices for attaining that object which I have herein shown and described.

The operation of the machine is as follows: The driver places the hook of the connecting-rod K over his knee, as shown in Fig. 3 of the drawings, and is thus at liberty to use both hands in driving. By placing his foot on the bent lever L he can hold down the rake-teeth with as strong a pressure as may be desired. When enough hay has been gathered by the teeth, the driver removes his foot from the lever L, and by a slight pull with his knee on the connecting-rod K presses the outer end of the lifting-lever J against the face of the wheel B. One of the wipers $a$ then comes in contact with the lever J and lifts the rake-frame G into the position shown by the red dotted lines in Fig. 2. As the rake-teeth rise they pass between the stripping-teeth H, which comb off the hay, and it falls upon the ground. In order to prevent the lever J from remaining in contact with the wiper $a$, which, in case the driver should forget to release his hold, would break some portion of the mechanism, I arrange the pivots of the hinges $g$ eccentrically to the driving-axle, so that as the frame is lifted the bent end of the lifting-lever J describes the arc of a circle passing outside of the circumference of the wheel B, as shown by the dotted lines in Fig. 2, and thus passes out of contact with the wiper and rests on the line of the wheel until relieved by the driver, when the several parts resume their former position. By this means the teeth can be elevated and held up as long as desired with but little effort on the part of the driver.

I do not claim broadly under this patent lifting the teeth of a horse-rake by automatic mechanism; but What I do claim as my invention, and desire to secure by Letters Patent, is—

1. The combination of the knee-lever or connecting-rod K and lifting-lever J with wipers on one of the wheels, substantially as described, for the purpose of enabling the driver to elevate and hold up the rake-teeth without using his hands at all, as set forth.

2. The combination of the rake-teeth with the bracket I, when combined, arranged, and operating as set forth.

In testimony whereof I have hereunto subscribed my name.

DANIEL W. AMOS.

Witnesses:
 JNO. G. FISHER,
 JOHN HOFER.